(12) United States Patent  
MacDonald et al.

(10) Patent No.: US 8,075,828 B2
(45) Date of Patent: Dec. 13, 2011

(54) METHOD OF MOLDING

(75) Inventors: Jeffrey Douglas MacDonald, North York (CA); Adam Craig Reynolds, Bolton (CA); Paul Michael Swenson, South Hamilton, MA (US); John Nicholas Kermet, Danvers, MA (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 121 days.

(21) Appl. No.: 12/683,866

(22) Filed: Jan. 7, 2010

(65) Prior Publication Data

US 2010/0114352 A1 May 6, 2010

Related U.S. Application Data

(62) Division of application No. 11/555,913, filed on Nov. 2, 2006, now Pat. No. 7,695,266.

(51) Int. Cl.
B29C 45/10 (2006.01)
B29C 45/16 (2006.01)

(52) U.S. Cl. .................... 264/328.1; 264/328.8

(58) Field of Classification Search ............ 264/328.1, 264/328.8; 425/190, 192 R
See application file for complete search history.

(56) References Cited

U.S. PATENT DOCUMENTS

| 5,183,621 | A  * | 2/1993  | Yukihiro et al. ........ 264/297.2 |
| 6,491,509 | B1 * | 12/2002 | Schad et al. ............ 425/130 |
| 6,517,337 | B1   | 2/2003  | Hehl |
| 7,559,756 | B2 * | 7/2009  | Sicilia ................... 425/130 |
| 2002/0102320 | A1 * | 8/2002 | Hahn et al. ............ 425/190 |
| 2004/0076703 | A1  | 4/2004 | Saulle |

FOREIGN PATENT DOCUMENTS

EP            0624449       * 11/1994

* cited by examiner

*Primary Examiner* — Jill Heitbrink
(74) *Attorney, Agent, or Firm* — Husky Intellectual Property Services

(57) ABSTRACT

Disclosed is a method of molding molded articles, amongst other things.

5 Claims, 2 Drawing Sheets

METHOD OF MOLDING

CROSS-REFERENCE TO RELATED APPLICATIONS

This application is a divisional of U.S. patent application Ser. No. 11/555,913 filed Nov. 2, 2006, the entire disclosure of which is incorporated herein by reference thereto.

TECHNICAL FIELD

The present invention generally relates to, but is not limited to, molding systems, and more specifically the present invention relates to, but is not limited to, a molding structure, and a method of molding, amongst other things.

BACKGROUND

Injection molding systems that are configured to produce molded articles having multiple layers of varying thermoplastic compositions typically have a high capital cost relative to injection molding systems that are configured to produce molded articles of a homogenous thermoplastic composition. A molded article having multiple layers may be, for example, a multi-layer preform, of the type that is blow molded into a bottle. A typical multi-layer preform includes three layers, the inner and outer layer are made from a first thermoplastic composition, resin 'A', such as polyethylene terephthalate (PET), while an intermediate layer may be made from a second thermoplastic composition, resin 'B', such as ethylene vinyl alcohol copolymer resin (EVOH). The intermediate layer of 'B' resin is commonly referred to as a barrier, as it functions to prevent oxygen and other gases from permeating through the molded article which may otherwise adversely affect the quality of a product, such as a beverage, that is sealed in the bottle.

The high capital cost of multi-layer injection molding systems presents a capital burden for preform producers (converters), for example, when purchasing a multi-layer molding system without first securing firm contracts to supply the multi-layer preforms. Today, the long lead time required to procure a multi-material molding system make it difficult for converters to react quickly to business multi-layer preform supply opportunities from the relatively fast-paced preform consumer market without otherwise having idle multi-layer molding equipment at the ready. A field upgrade of a purpose built mono-layer molding system is not practical owing to the extent to which the molding structure of the system would need to be altered, not the least of which is a required machining of the stationary platen to incorporate a passageway to accommodate a second injection unit. The net effect of the foregoing is that preform converters have been reticent to go after multi-layer preform business.

U.S. Pat. No. 6,517,337 (Inventor: HEHL, Karl, Published: 11 Feb., 2003) describes an injection molding machine having a plurality of modular drive groups that provides possibilities for the customer to optimize the injection molding machine depending on the injection molded product.

SUMMARY

According to a first aspect of the present invention, there is provided a method for molding a molded article. The method includes the steps of factory configuring a modular molding system having an initial-build configuration for producing a molded article of a first molding composition, and factory configuring the modular molding system to be field upgradable with a module to an upgraded configuration for producing the molded article including a combination of the first molding composition and a second molding composition.

A technical effect, amongst others, of the aspects of the present invention is that the modular molding system provides the molder, such as a preform converter, the ability to promote production capacity for multi-layer molded articles, for example, on a shorter notice and with a lower initial capital equipment cost than heretofore possible. Upon securing a contract for the multi-layer preforms the molder need only purchase and field install the required module to upgrade the functionality of the molding system.

Preferable embodiments of the present invention are subject of the dependent claims.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and may be illustrated having phantom lines, diagrammatic representations and fragmentary views. In certain instances, details that are not necessary for an understanding of the exemplary embodiments or that render other details difficult to perceive may have been omitted.

DETAILED DESCRIPTION OF THE EXEMPLARY EMBODIMENTS

Figure 1:
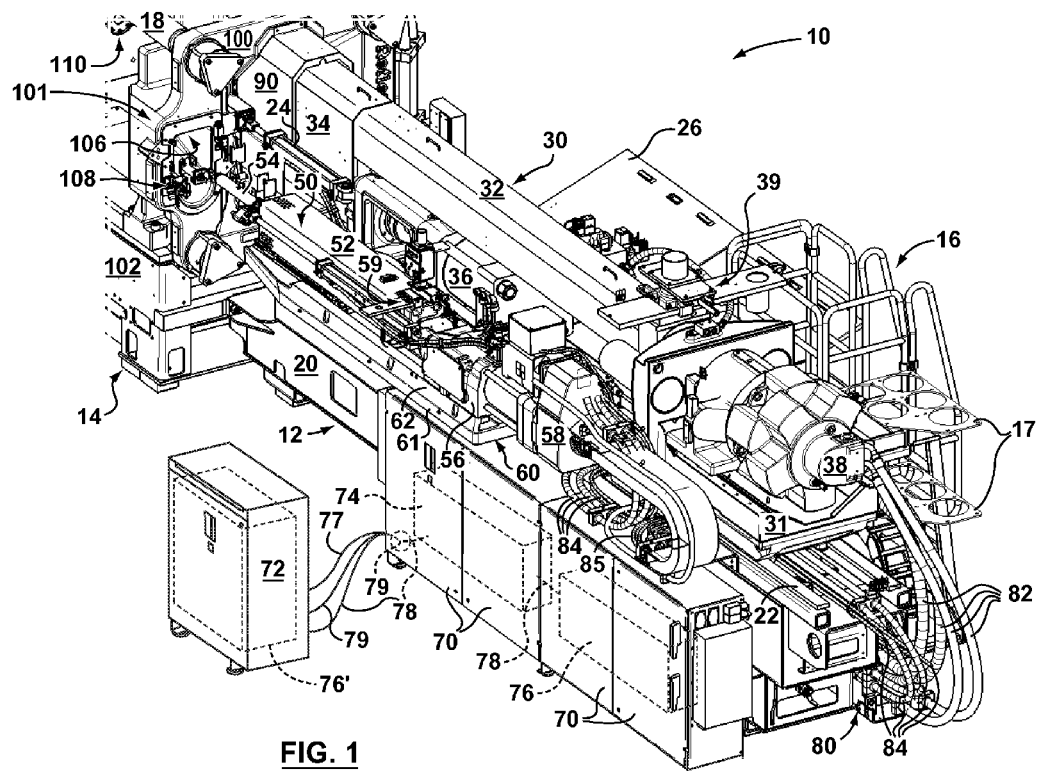
FIG. 1 is a perspective view of a upgradable injection molding system according to a first exemplary embodiment (which is the preferred embodiment)

With reference to FIG. 1, molding structure is shown that has been configured for molding multi-layer molded articles, such as multi-layer preforms. The molding structure includes a modular molding system 10 having an injection unit 12 and a clamp unit 14. More particularly, the modular molding system 10 includes an initial-build configuration consistent with a purpose-built mono-layer system with an upgrade module including the molding structure of a purpose-built multi-layer molding system.

Alternatively, the molded article could be a simple multi-material molded article not having discreet layers.

The initial-build of the injection unit 12 includes an 'A' injection unit. The 'A' injection unit 30 is arranged on a base 20. More particularly, the base 20 includes a pair of rails 22 upon which a carriage 31 of the 'A' injection unit 30 is slidably arranged. The carriage 31 is connected to a stationary platen 100 of the clamp unit 14 by at least one carriage actuator 24.

The 'A' injection unit 30 includes an extruder 32. Preferably, but not exclusively, the 'A' injection unit 30 also preferably includes a shooting pot 36. As shown, the shooting pot 36 is connected to the extruder 32 by a distributor 34. Each of the extruder 32, the distributor 34 and the shooting pot 36 are connected to the carriage 31. Also shown is a screw drive 38 for operation of a screw (not shown), preferably by means of rotating and reciprocating of the screw in a barrel (not shown) of the 'A' extruder 32. The configuration and the operation of the 'A' injection unit 30 is in keeping with known two-stage injection units, the structure and the operation of which is well-known to those skilled in the art, and need not be described in any detail hereafter. The 'A' injection unit 30 is also shown as including an 'A' hopper valve 39 for controllably connecting the extruder 32 with a supply of 'A' resin.

The injection unit 12 is configured, at initial-build, to receive a 'B' injection unit 50. For example, the base 20 of the injection unit 12 is configured to include a pair of mounts 64 upon which a 'B' unit support 60 is connectable. The 'B' unit support 60 comprises a base 61 and a pair of rails 62.

The 'B' injection unit 50 is slideably arranged on the rails 62 of the 'B' unit support 60. The 'B' injection unit 50 includes an extruder 52 and a screw drive 58 for rotation and reciprocation of a screw (not shown) in a barrel (not shown) of the extruder 52. The drive 58 preferably includes an electrical motor for screw rotation and a hydraulic actuator for screw reciprocation. Alternatively, the drive 58 may be fully electric, fully hydraulic, or any combination thereof. The 'B' injection unit 50 further includes at least one carriage actuator 52 connecting the carriage 56 to the platen 100 of the clamp unit 14. The nozzle 54 is preferably configured to cooperate with a nozzle shut-off actuator 108 for controllably connecting the mold (not shown) with the extruder 52. As will be described hereinafter, the nozzle shut-off actuator 108 is connected to the stationary platen 100. The 'B' injection unit 50 further includes a nozzle 54 for connection of the extruder 52 to a mold (not shown). The 'B' injection unit 50 is also shown as including a 'B' hopper valve 59 for controlling a flow of molding resin from a reservoir (not shown) to the extruder 52.

The base 20 of the injection unit 12 includes a hydraulic power pack (not shown) on the non-operator side of the injection unit. The power pack is accessible behind power pack covers 26, the power pack cover 26 shown in FIG. 1 being in an open position for accessing the power pack. A walkway 16 is shown on the non-operator side of the injection unit 12. Not shown is a removable power pack cover adjacent to the ladder of the walkway 16. At the rear of the injection unit 12, just behind the walkway 16, is a rack 17 for accommodating a plurality of hydraulic accumulators. The rack 17 shown in FIG. 1 is configured for accommodating five cylinder-type hydraulic accumulators. The hydraulic accumulators, as is generally known, are connected to the power pack (not shown) and with a power manifold 80 shown at the rear of the injection unit 12. The power manifold 80 is in turn controllably connected with the actuation devices of the molding system 10. For example, a set of hydraulic hoses 82 are shown connecting the power manifold 80 with the 'A' carriage actuators 24 and the screw drive 38. Also shown are a second set of hydraulic hoses 84 connecting the power manifold 80 with the 'B' screw drive 58 and the 'B' carriage actuators 24. As shown, the 'B' unit hydraulic hoses 84 are routed along the base 20 in a service tray 19.

Along the operator side of the injection unit 12 are the main control modules 70. The main control modules include a machine controller 74, shown in hidden lines behind the doors of the module 70 as well as a control device 76 also show in hidden lines within the module 70. The controller 74 and the control device 76 are interconnected by means of a data bus 78. Likewise the actuators and feedback devices of the molding system, such as hydraulic actuators, servo motors, position sensors, pressure sensors, and the like are interconnected to the control device 76 by the data bus 78 or alternatively or in combination with dedicated wiring. The main control module 70 further includes a control interface 79 for interconnection of an auxiliary control module 72, shown as a free-standing unit. The auxiliary control module 72 may include control hardware such as servo drives, injection control cards, and servo amplifiers for controlling of the drive 56. The auxiliary control module 72 may also include a controller for the barrel heaters of the 'B' unit extruder 52. The auxiliary control module 72 may also include a third-party heat controller for a hot runner of the mold (not shown) or an interface for connection therewith. The auxiliary control module 72 may also include a dual-voltage control outlet for peripheral devices such as mixers or blenders. A data bus 78, power cable 77, and device cable 79 are shown linking the main control module 70 with the auxiliary control module 72

Alternatively, the main control module 70 may otherwise house the control devices of the auxiliary control module 72.

Figure 2:
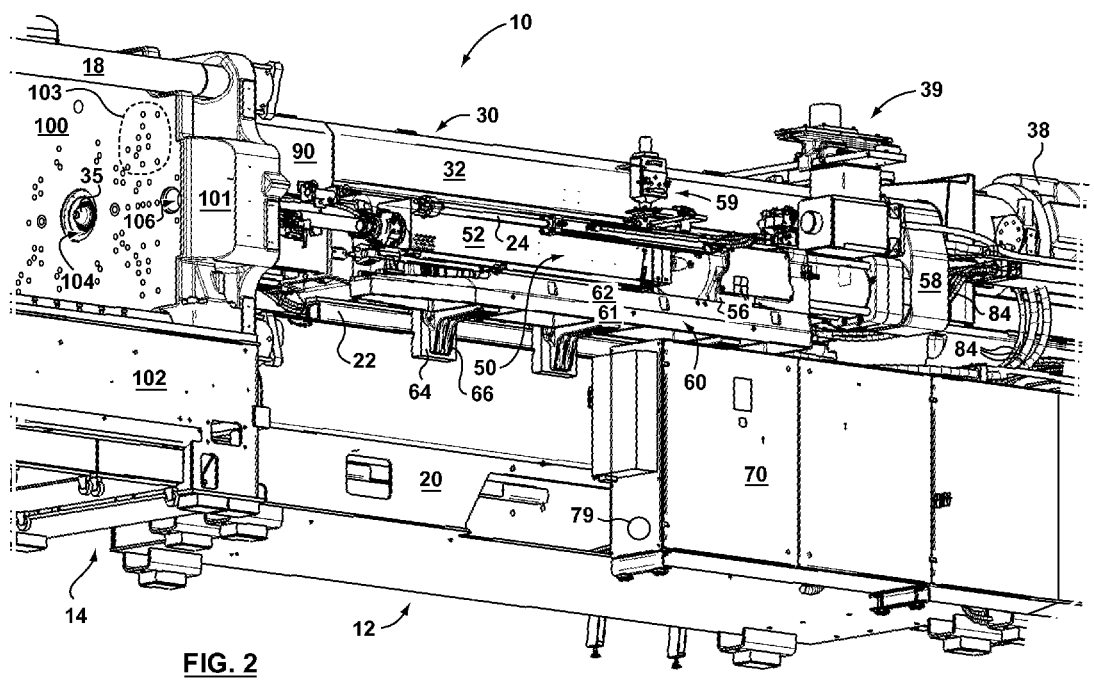
FIG. 2 is another perspective view of the upgradable injection molding system of FIG. 1.

With reference to FIG. 2, the structure of the 'B' unit support 60 is shown in more detail as including angle brackets 66 supporting the base 61 of the 'B' unit support 60. The brackets 66 connectable to the mounts 64 that are preferably integrated with the machine base 20. Also shown in FIG. 2 is a purge guard 90 for the 'A' injection unit 30. The 'A' injection unit guard 90 preferably includes an access door through which the operator can remove drool from the extruder 32. The door (not shown) is preferably re-located on the non-operator side of the machine for ease of access. Not shown is a 'B' injection unit purge guard that would otherwise mount to a purge guard mount 109 provided on the rear of the stationary platen 100.

The clamp unit 14 includes a base 102 upon which is slideably arranged the stationary platen 100. Also shown is a moving platen 110 that is slideably arranged on the base 102. A series of tie bars 18 interconnect the moving platen and a clamp (not shown). The stationary platen 100 includes a platen ear 101 as a projection extending from the operator side of the platen 100. Alternatively the platen ear 101, and hence the 'B' injection unit 50, could be located on the non-operator side of the platen 100. The platen ear 101 defining a 'B' passageway 106 which extends between the front and back of the stationary platen 100 for passage of the machine nozzle 54 of the 'B' injection unit 50. Likewise, as shown in FIG. 2, there is provided an 'A' passageway 104 for passage of a machine nozzle 35 of the 'A' injection unit 30 for connection with the mold (not shown).

The front face of the stationary platen includes the mold mounting pattern 103. The mold mounting pattern may include standard mounting configurations such as Euromap and SPI and may further include proprietary mounting patterns for such mold makers as KORTEC (a trademark of Kortec Incorporated, Massachusetts, USA) for their multi-layer preform molds.

As indicated previously, the stationary platen 100 may include a nozzle shut-off actuator 108 connected to the platen ear 101 that is configured for operation of the valve of the nozzle 54 of the 'B' injection unit 50.

The modular molding system 10 described hereinbefore is preferably factory configured to have an initial-build configuration for producing a molded article of a first molding composition. The modular molding system 10 configured to be field upgradable with a module to an upgraded configuration for producing the molded article including a combination of the first molding composition and a second molding composition. The initial-build configuration of the modular molding system 10 preferably includes a molding structure of a purpose-built mono-layer molding system, and a first subset of a molding structure of a purpose-built multi-layer molding system. The module having a remainder subset of the molding structure of the purpose-built multi-layer molding system.

A technical effect of the exemplary embodiment of the present invention is that the molder can defer capital expenditure for a multi-layer molding system until a contract for the molded article is made knowing that the upgrade of the pre-configured monolayer molding system to multi-layer can be purchased, assembled, and tested at the customer's facility in a short amount of time.

Accordingly, what follows are examples of differentiating technical features between a purpose-built mono-layer molding system and a purpose-built multi-layer molding system.

For example, the injection unit walkway 16 is preferably moved from the operator side to the non-operator side as shown, but that there is space on the operator side to accommodate the injection unit 50.

Alternatively, the accumulator rack 17 may include an extra mount for an additional accumulator as required to increase the capacity of the hydraulic system for operation of the injection unit 50.

Alternatively, the 'B' unit hydraulic hoses 84 and electrical control cables 85 for the 'B' injection unit may be pre-configured in service trays 19 on the injection unit base or at the very least, the service trays 19 are provided and the hydraulic hoses and electrical cables 84 and 85 would be supplied at the time of upgrade.

Alternatively, the injection unit base 20 would be pre-configured to include the mount 64 for the 'B' unit support 60.

Alternatively, the power pack cover (not shown) that is arranged behind the walkway 16 would need to be removable because the walkway 16 would prevent the power pack cover 26 from being opened.

Alternatively, the main control module would be configured to include the control interface 79 for interconnection of the auxiliary control module 72. The power manifold 80 would be pre-configured to include connections for supplying hydraulic fluid to the 'B' injection unit. The port for the 'B' injection unit on the power manifold 80 would be plugged at the factory, the power pack 80 otherwise configured preferably for a continuous supply of high pressure oil to the 'B' injection unit once connected.

The base 20 of the injection unit encompasses a hydraulic tank. Alternatively, the tank may need to have a capacity that's in excess of a typical mono-layer to accommodate the 'B' injection unit 50.

Alternatively, the 'A' purge guard 90 would require that the door be moved to a non-operator side because the door, which would normally be on the operator side, is obstructed by the inclusion of the 'B' injection unit 50 and that also the 'A' purge guard preferably includes an operator side extension.

Alternatively, the stationary platen 100 would be provided with covers for the 'B' passageway 106 preferably on the front end and backs of the platen, although possibly only in the front of the platen.

Alternatively, the gates of the molding system which are not shown would need to accommodate the platen ear 101.

Alternatively, other subtleties of the factory assembly of the modular molding system (10) may include the orientation of the barrel heaters (not shown) of the 'A' injection unit 30 such that the clamps (not shown) of the heaters are accessible from the non-operator side for ease of system maintenance.

Alternatively, a computer-readable product is provided, the product embodying one or more instructions executable by the controller 74 for controlling the control device 76' for the 'B' injection unit 50, and interface screens on the human machine interface (not shown).

Alternatively, a spacer (not shown) is provided for a molded article handling device to align the molded article with the mold.

The first subset of the purpose-built multi-layer molding system configured with the initial-build configuration from the factory preferably includes the stationary platen 100 having the 'A' passageway 104, the stationary platen 100 having the 'B' passageway 106, the mount 64, the main control module 70 including the controller 74, the control device 76, and the control interface 79, the power manifold 80, and a cover plate for the 'B' passageway 106.

The first subset may also include the expandable accumulator rack 17, the 'A' purge guard 90, the 'B' service tray 19, the walkway 16, and the gate.

The remainder subset of the purpose-built multi-layer molding system configured with the module for field upgrading of the modular molding system preferably includes the 'B' injection unit 50, the 'B' unit support 60, the control device 76' for the 'B' injection unit.

The remainder subset may also include the auxiliary control module 72 including the control device 76' of the 'B' injection unit, the auxiliary control module 72 configured for connection with the main control module 70 through a control interface 79.

The remainder subset may also include the computer-readable product.

Other molding structure that may accompany the module with the remainder subset includes the 'B' nozzle shut-off actuator 108, the 'B' purge guard, the 'B' hopper valve 59, the hydraulic hose 84, the cable 85, and the spacer for the molded article handling device. Likewise, the module may include auxiliary equipment for the molding system such as a barrier drier for the 'B' molding composition, and auxiliary equipment such as a shuttle table for use with the clamp unit 14.

An exemplary method of the present invention includes the steps of factory configuring a modular molding system 10 having an initial-build configuration for producing a molded article of a first molding composition, and factory configuring the modular molding system 10 to be field upgradable with a module to an upgraded configuration for producing the molded article including a combination of the first molding composition and a second molding composition. The method also preferably includes the steps of factory configuring the initial-build configuration of the modular molding system 10 to include a molding structure of a purpose-built mono-layer molding system, and the first subset of a molding structure of a purpose-built multi-layer molding system. The method further including the step of field configuring the modular molding system 10 to include the module having the remainder subset of the molding structure of the purpose-built multi-layer molding system.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A method of providing a multi-layer molding system for molding a molded article, comprising the steps of:
providing a modular molding system having an initial-build configuration for producing a molded article of a first molding composition, wherein the initial-build configuration includes i) a molding structure of a purpose-built mono-layer molding system; and ii) a first subset of a molding structure of a purpose-built multi-layer molding system;

providing the modular molding system having the initial-build configuration includes the steps of providing:
an injection unit having a base upon which is arranged an 'A' injection unit;
a clamp unit;
a stationary platen of the clamp unit having an 'A' passageway for accommodating a nozzle of the 'A' injection unit;
the stationary platen having a 'B' passageway for accommodating a nozzle of a 'B' injection unit;
a mount connected to the base, the mount connectable with a 'B' injection unit support;
a main control module including a controller linked with a control device for the 'A' injection unit, a control device for the 'B' injection unit, and a control interface that is configured for linking the control device of the 'B' injection unit that are arranged in an auxiliary control module;
a power manifold connected to the base, the power manifold being configured to be connectable with a 'B' injection unit; and
a cover plate for the 'B' passageway;
wherein the modular molding system is field upgradable with providing a module having a remainder subset of the molding structure of the purpose-built multi-layer molding system to an upgraded configuration for producing the molded article including a combination of the first molding composition and a second molding composition.

2. The method of claim 1, wherein the step of providing the modular molding system having the initial-build configuration includes the step of providing:
an accumulator rack that is configured to receive an additional hydraulic accumulator;
an 'A' purge guard;
a 'B' service tray connected to the base, 'B' the service tray configured for routing at least one of a hydraulic hose or a control cable to a 'B' injection unit;
a walkway;
a gate for the clamp unit configured to enclose a platen ear of a stationary platen.

3. The method of molding of claim 1, wherein the step of providing the module having the remainder subset of the molding structure of the purpose-built multi-layer molding system includes the step of providing:
the 'B' injection unit;
the 'B' unit support;
the auxiliary control module for the 'B' injection unit.

4. The method of molding of claim 3, wherein the step of providing the module having a remainder subset of the molding structure of the purpose-built multi-layer molding system includes the step of providing:
an auxiliary control module including the control device of the 'B' injection unit, the auxiliary control module configured for connection with the main control module through a control interface.

5. The method of molding of claim 3, wherein the step of providing the module having a remainder subset of the molding structure of the purpose-built multi-layer molding system includes the step of providing:
a computer-readable product embodying one or more instructions executable by a controller for controlling: (i) a control device for the 'A' injection unit, (ii) a control device for the 'B' injection unit, and (iii) a human machine interface;
a 'B' nozzle shut-off actuator;
the 'B' purge guard;
a 'B' hopper valve;
the hydraulic hose for linking a drive of a 'B' injection unit with the power manifold of the injection unit;
a cable for linking a drive of a 'B' injection unit with at least one of a control bus and a power bus of the injection unit;
a spacer for a molded article handling device.

* * * * *